Patented Dec. 14, 1948

2,456,265

UNITED STATES PATENT OFFICE 2,456,265

MODIFYING AGENTS FOR USE IN LOW-TEMPERATURE POLYMERIZATION REACTIONS

Per K. Frolich, Westfield, N. J., assignor, by mesne assignments, to Jasco, Incorporated, a corporation of Louisiana No Drawing. Application January 30, 1942,
Serial No. 428,834

11 Claims. (Cl. 260—93)

This invention relates to hydrocarbon polymers; relates particularly to interpolymers of an iso-olefin with a diolefin and relates particularly to external lubricants for improving the handling and processing characteristics of rubbery polymer materials.

It is known that high molecular weight, synthetic polymers of an iso-olefin such as isobutylene, or interpolymers of an iso-olefin such as isobutylene with a diolefin such as butadiene or isoprene or piperylene or dimethyl butadiene can be produced by the use of a low temperature technique, in which the olefin or mixed olefins are cooled to temperatures ranging from —20° C. to —100° C. or —150° C., or even lower, by the admixture with the olefin or mixed olefins of a diluent-refrigerant such as liquid ethylene or other low boiling liquid hydrocarbon substances, or by the use of solid carbon dioxide or by suitable external refrigeration of the reactor, in which cases the reactants are preferably admixed with a diluent such as methyl chloride; and applying to the cool mixture a dissolved active halide catalyst, or Friedel-Crafts type catalyst, such as AlCl₃ or AlBr₃ or titanium tetrachloride or the like, dissolved in a low freezing, inert solvent such as ethyl or methyl chloride or carbon bisulfide. The catalyst may be introduced, for example, by spraying it onto the surface of the rapidly stirred olefinic mixture, or by mixing it directly into the body of the agitated liquid. The reaction begins promptly and may reach a desired stage, approaching complete polymerization within a relatively few minutes. The material obtained after interpolymerizing the mixed olefins has a low unsaturation, usually measured by an iodine number ranging from 1 to 40 or 50, and usually has a molecular weight above 15,000, preferably within the range of about 40,000 to about 150,000 or even higher. The interpolymeric material, in spite of its relatively low unsaturation, shows the property of reactivity with sulfur to produce a cured material having an elastic limit, a tensile strength at break ranging from 1,000 to 5,000 pounds per square inch and an elongation at break ranging from 500% to 1200%.

The polymer is a plastic, elastic solid, but it has been found exceedingly difficult to obtain the solid polymer in the form of small particle aggregates with a physical structure adapted for efficient and convenient subsequent processing through such steps as the flashing off of unreacted olefinic material, diluent and refrigerant; and the washing out of spent catalyst or residual catalyst. Also, it is difficult to prevent cohesion between the particles of polymer, and to prevent adhesion of the particles of polymer to the reactor, to the supporting screens in the drier, and other metal objects with which it comes in contact. These characteristics of the newly polymerized material interfere seriously with the complete removal of spent and surplus catalyst, since the sticky character of the polymer causes it to adhere to treating apparatus, and to cohere in relatively large lumps, containing occluded catalyst which cannot be washed out.

According to the present invention, these undesirable polymer characteristics are eliminated and fine particle suspensions or slurries are obtained by adding into the reaction mixture, either prior to the polymerization reaction, or prior to the flashing operation, a small quantity of an inorganic salt of a higher fatty acid. These salts, generally termed soaps, are preferably prepared from fatty acids of a saturated nature.

The present invention provides a new and useful combination of steps for the processing of low temperature polymerizates to produce the solid olefinic polymers or interpolymers in the form of fine grained slurries; to the making of polymer or copolymer slurries in water which are readily handled; and to the improving and preserving of their physical properties during storage, drying and subsequent mechanical working and masticating.

Then an object of the invention is to provide a simple method for preventing the agglomeration of the low temperature poly-iso-olefin-polyolefinic rubber-like materials by the incorporation into the reaction mixture prior to polymerization or to the flashing operation of a water insoluble, alkaline earth, or metal, salt of a higher fatty acid. Other objects and details of the invention will be apparent from the following description.

Broadly, the present invention consists of the steps of preparing a reactive mixture of the desired olefinic material at the desired low temperature, as taught in the copending application of Thomas and Sparks, Serial No. 182,252, filed Dec. 29, 1937 now U. S. Patent 2,356,127; the reacting material being preferably isobutylene, either with or without a diolefin such as butadiene, or isoprene, or 2,3-dimethyl-1,3 butadiene; or with piperylene, or a non-conjugated diolefin such as ?-methyl hexadiene-1 5; 2.6-dimethyl-hexadiene-1,5; or triolefins such as hexatriene, myrcene, 1,6-dimethyl heptatriene-1,3,5 and 2,4,6-trimethyl-1,3,5-hexatriene or the like; and cooling the mixture by internal or external refrigeration, e. g.

by liquid ethylene, to a temperature ranging from −10° C. to −100° C. or as low as −160° C. To this mixture there is then added a small quantity of a water insoluble soap of a saturated fatty acid of a metal selected from the class consisting of aluminum, magnesium and zinc. The water insoluble soap may be added as such in a fine powdery form or may be dissolved in methyl chloride. After the water insoluble soap has been thoroughly dispersed in the reaction mixture, there is then added a Friedel-Crafts type active halide catalyst; which may be boron fluoride or aluminum chloride in solution in an inert low freezing solvent or may be other similar active halide catalyst materials. This polymerization reaction is conducted under conditions to give a finely pulverulent form of polymer or interpolymer particles, which is highly desirable in order to permit the maximum speed of processing the solid polymer in subsequent operations.

The Friedel-Crafts type active halide catalyst may be selected from the group of Friedel-Crafts catalysts, as disclosed by N. O. Calloway in his article on the "Friedel-Crafts synthesis" printed in the issue of "Chemical Reviews" published for the American Chemical Society at Baltimore in 1935, in volume XVII, No. 3, the article beginning on page 327, the list being particularly well shown on page 375. The materials shown in this Calloway article as Friedel-Crafts catalysts are all useful as Friedel-Crafts catalysts in the reaction herein disclosed.

When the polymerization reaction has reached the desired stage of completion, the unreacted materials are quickly drained off and the polymer is contacted with a jet of high pressure steam whereby the residual unreacted materials are removed from the polymer or the polymerization reaction mixture is quickly warmed to remove the unreacted olefinic materials, followed by a water wash to remove the decomposition products of the catalyst and the polymer is recovered as a fine-grained slurry.

As an alternative to the above procedure, the water insoluble soap, instead of being added to the polymerization mixture prior to polymerization, may be dissolved in or suspended in ethyl ether, a ketone, or an organic acid or preferably in a low molecular weight alcohol such as isopropyl alcohol and the solution or mixture used in dispersing the water insoluble soap throughout the polymer, during the flashing operation, if desired. This procedure likewise permits the production of solid polymer or interpolymer in the form of a fine grained slurry.

*Example 1*

A mixture consisting of 1,000 parts by volume of isobutylene containing 1.2% of commercial piperylene was diluted with 4,000 parts of liquid ethylene. To this mixture there was then added 19 parts (by weight) of zinc stearate. The mixture was prepared in a reactor equipped with a powerful stirrer and provided with a cover to avoid contact with the air and to confine the volatilized portions of the mixture. The reactor was carefully insulated to reduce the rate of heat inflow and to reduce the volatilization of the ethylene refrigerant. The catalyst was prepared by dissolving commercial anhydrous aluminum chloride in methyl chloride at the boiling point of the methyl chloride to yield a saturated solution containing about 1.3% of materials calculated as $AlCl_3$. This solution was then diluted with an additional amount of methyl chloride to produce a solution containing 0.5% of dissolved $AlCl_3$. This solution was then precooled to −78° C. and applied through a spray nozzle onto the surface of the vigorously stirred olefinic mixture. The polymerization proceeded rapidly and was approximately 80% complete in about 5 to 7 minutes. When this stage of polymerization was reached, the polymerization mixture was filtered off from the unreacted liquid portion and the polymer was contacted with a jet of high pressure steam.

The polymer was formed in the reactor as a fine-particle slurry in the residual liquids, particularly the ethylene. The slurry was then dumped into a flash tank for the final separation of the polymer and the diluent-refrigerant and it was found to retain its fine-particle character with no perceptible tendency to coalesce into large aggregates. The solid polymer, after thorough washing with water and drying was found to have a molecular weight of 50,000. This molecular weight was satisfactory and the polymer was suitable for compounding and curing with sulfur to give desirable vulcanizates and the polymer material was found to be in a particularly advantageous form for subsequent processing, including such steps as drying with hot air and for mechanical working on the mill.

*Example 2*

A mixture consisting of 1 part by volume of isobutylene containing 1.25% of commercial piperylene was diluted with four parts of liquid ethylene. The mixture was prepared in a reactor equipped with a powerful stirring device and provided with a cover to avoid contact with air. The reactor also was well insulated to reduce the rate of volatilization of the refrigerant (ethylene) by ambient heat. The catalyst was prepared by dissolving commercial anhydrous $AlCl_3$ in methyl chloride at the boiling point of the methyl chloride to yield a saturated solution containing about 1.3% of materials calculated as $AlCl_3$. This solution was then diluted with an additional amount of methyl chloride to produce a solution containing 0.5% of dissolved $AlCl_3$. This solution was then precooled to −78° C. and applied through a spray nozzle onto the surface of the vigorously stirred reaction mixture. The polymerization proceeded rapidly and was approximately 80% complete in about 5 to 7 minutes.

When this stage of polymerization was reached, the polymerization mixture was diluted with about 200–500 cc. of isopropyl alcohol to arrest further polymerization. The polymer formed was in a fine particle slurry. When the polymer slurry, however, was dumped into a tank containing vigorously agitated water (about 70° C. and lower) in order to remove the catalyst by-products and volatilize the unreacted materials and diluent-refrigerant, there was a tendency for the slurry particles to agglomerate into a large bulky mass, quite different from Example 1. The solid polymer, after thorough water washing and drying was found to have a molecular weight of 50,000. This molecular weight was satisfactory and the polymer was suitable for compounding and curing with sulfur to give desirable vulcanizates, the tendency of the polymer material, however, to coalesce after polymerization, in the water wash and washing steps, was highly undesirable since the coalesced material is difficult to handle and is not suitable for plant operations such as hot air drying and mechanical working on mill rolls.

Example 3

An olefinic mixture containing 96 volumes of isobutylene and 4 volumes of isoprene (70% purity was prepared as in Example 1 and polymerized in the presence of 200 volumes of ethylene. A solution of aluminum chloride in methyl chloride was used as the catalyst. After adding isopropyl alcohol containing a suspension of zinc stearate, the polymer slurry was dumped into water. The reaction slurry in water was much more finely divided than in experiment 1. On standing, the reaction slurry showed very little tendency to coalesce and the product slurry was in a satisfactory condition for handling in that the slurry was readily removed from the wash tank, filtered, and dried in a hot air oven without adhering to the oven trays.

Example 4

Example 3 was repeated with the following variation: no zinc stearate was added either to the polymerization reaction mixture, nor to the washing medium. After the polymerization reaction was completed and the polymer quickly drained from the unreacted liquid portion, it was noted that, after treating with a jet of high pressure steam and dumping the product slurry into a water wash tank, a porous non-dispersed product was obtained, whereas in the presence of zinc stearate, as in Examples 1 and 3, a fine-grained product slurry was obtained in both instances.

The above Examples 1 and 3 inclusive are representative in character and the processes disclosed are applicable to olefinic materials other than those mentioned; applicable both to other poly-olefinic materials such as triolefins and those containing 4, 5, 6 and even more double bonds. Similarly, the procedure of Examples 1 and 3 was found applicable to the polymerization of isobutylene only, which gave fine grained polyisobutylene slurries readily handled in all processing operations.

Example 5

As above indicated the reaction may be practiced conveniently by either internal or external refrigeration, internal refrigeration being shown in Examples 1 and 3.

According to the present example, a mixture of 1000 parts by volume of isobutylene containing 1.2% of commercial piperylene was diluted with 4000 parts of liquid methyl chloride. To this mixture there were then added 19 parts by weight of zinc stearate. The mixture was prepared in a reactor equipped with a powerful stirrer, a cover, and a refrigerating jacket filled with liquid ethylene, the refrigerating jacket being heat insulated to reduce the rate of heat inflow. The catalyst was prepared by dissolving commercial anhydrous aluminum chlorine in methyl chloride at the boiling point of the methyl chloride to yield a nearly saturated solution containing about 1.3% of material calculated as $AlCl_3$. This solution was then diluted with an additional amount of methyl chloride to produce a solution containing 0.5% of dissolved $AlCl_3$ material. This catalyst solution was then cooled to −78° C. and applied through a spray nozzle onto the surface of the vigorously stirred olefinic mixture. During this procedure the cooling jacket was kept filled with liquid ethylene to maintain a temperature in the reaction mixture ranging between −95° C. and −103° C. The polymerization proceeded rapidly and was approximately 80% complete in between 5 and 7 minutes. When this stage of polymerization was reached, the polymerization mixture was run into an auxiliary vessel and water added, followed by relatively large amounts of hot water. This treatment with water flashed off the volatilizable unreacted materials, including the methyl chloride and unreacted portions of isobutylene and piperylene. The mixture formed a fine grained slurry in the water which was conveniently washed by decantation or filtering with additional water. On prolonged standing, the slurry showed a tendency to settle out, but no tendency to coalesce and the fine grained slurry product was in very satisfactory condition for subsequent handling, washing, drying, and similar operations.

Example 6

An olefinic mixture containing 96 volumes of isobutylene and 4 volumes of isoprene (70% purity) was prepared as in Example 5, together with 200 volumes of ethylene, and placed in a reactor having an ethylene jacket for cooling as in Example 5. A catalyst was prepared like that used in Example 5 and applied to the olefinic mixture in the same way to polymerize the reactants to 80% or more of completion. When this stage of polymerization was reached, the unreacted components were largely poured off, and the residue was treated with isopropyl alcohol containing zinc stearate in suspension. The resulting slurry was quickly dumped into water to which there was then added relatively large amounts of additional hot water. This treatment volatilized out all of the unreacted materials as well as the methyl chloride. In this instance also a high grade fine grained slurry was obtained which was easy to wash either by filtration or decantation, was particularly advantageous for reslurrying and was in a particularly convenient form for further handling, including further washing, drying, milling and other processing.

These examples and the practicing of this invention show that the broad class of water insoluble alkaline earth and metal salts of the higher fatty acids such as zinc, aluminum and magnesium salts of saturated fatty acids represented by caproic, caprilic, capric, myristic, palmitic, lauric and stearic acids will function to control and reduce the coalescing tendency of the slurry of polymer in liquid, perhaps as external lubricants when added to the polymers either in the process of their formation or after formation and in the course of subsequent processing in order to decrease the extent of agglomeration and to reduce the tendency for the polymer to adhere to metal and to coalesce in the intermediate drying and processing operations.

Of the alkaline earth and metal salts of the fatty acids enumerated above and as illustrated by the present invention, zinc stearate, aluminum stearate, aluminum palmitate, calcium palmitate and magnesium stearate are the preferred species to be added severally or in admixture in the form of soft, fine powders to the reaction mixture prior to the commencement of the polymerization reaction. Zinc stearate, however, is preferred since it is a valuable constituent in any subsequent curing operation. Since some of these salts are soluble in isopropyl alcohol or any other alcohol or ether which may be used as dispersing mediums, they may be incorporated in the form of the alcoholic or ether solution or suspension and used as such in distributing the water insoluble soaps throughout the polymer mass.

Example 7

The polymer obtained from Example 1, substantially free from catalyst and catalyst breakdown products, was thoroughly washed with water to remove the catalyst break-down products, and after drying was compounded according to the following formula:

| | Parts |
|---|---|
| Polymer | 100 |
| Zinc oxide | 5 |
| Stearic acid | 3 |
| Sulfur | 1.5 |
| Tuads (tetramethyl thiuram disulfide) | 1 |

This compound was prepared by working the polymer on a roll mill and adding the various additional components to the material on the mill, cutting the sheet of compound back and forth across the mill. The compounded material was then placed in a mold and cured at a temperature of approximately 155° C. for a time interval of 60 minutes, at the end of which time it was found to be fully cured and to have a tensile strength of about 3270#/sq. in.

The polymer obtained from Example 3 was similarly treated, compounded according to the above formula and cured at 155° C. for 60 minutes, at the end of which time it was found to be fully cured and to have a tensile strength of about 3000#/sq. in.

A microscopic examination of the cured stocks showed unusual characteristics. The product made according to Example 2 showed the presence of crystalline material and the presence of vacuoles around these crystals, whereas these undesirable characteristics were not present in the stocks prepared in accordance with Examples 1 and 3.

The physical phenomenon involved in the formation of fine grained slurries of the polymeric materials by the addition of alkaline earth or metal salts of the higher fatty acids to the low temperature polymerization reactions or the solution or suspension of these salts in alcohol or other suitable washing medium is not as yet known. Their main function is presumed to be that of coating or lubricating the polymer particles during the polymerization reaction and in the wash step in order to decrease the extent of agglomeration and to reduce the tendency of the polymer particles to coalesce and adhere to the metal system of the reactor vessel. This presumption is offered only as a possible suggestion but it has not, however, been proved and I do not wish to be restricted by any theory or hypothesis as to the mechanism of this invention.

In the above examples and throughout this specification and the appended claims, wherever the term "olefinic material is used, it refers to iso-olefins such as isobutylene or to polyolefins such as butadiene, isoprene, piperylene; 2-methyl hexadiene-1,5; myrcene, hexatriene or any other monoolefin or polyolefin or homologue thereof, capable of interpolymerization with an iso-olefin.

Thus the invention consists of the steps, in combination, of adding to the polymerization mixture of olefinic or olefinic-polyolefinic materials at low temperatures a water insoluble salt of a higher fatty acid, washing the polymer or interpolymer in solid particle form while retaining high grade physical, chemical properties in the compounded polymer or interpolymer.

While there are above disclosed but a limited number of embodiments of the invention, it is possible to produce still other embodiments without departing from the inventive concept herein disclosed and it is therefore desired that only such limitations be imposed upon the appended claims as are stated therein or required by the prior art.

The invention claimed is:

1. A polymerization process comprising the steps in combination of mixing together liquefied isobutylene, liquefied ethylene and zinc stearate and polymerizing the mixture by the application thereto of a Friedel-Crafts active halide catalyst, to yield a fine grained non-coalescing slurry of solid polymer having a molecular weight within the range of 15,000 to 150,000.

2. In a polymerization process including the steps of cooling an olefinic material comprising isobutylene and a polyolefin having from 4 to 9, inclusive, carbon atoms per molecule to a temperature below −50° C. to as low as −150° C., adding an active halide Friedel-Crafts catalyst thereto and polymerizing the olefinic material to a desired stage to yield a solid polymer having a molecular weight within the range of 15,000 to 150,000, the steps in combination comprising adding a dispersing medium containing zinc stearate, warming the resultant mixture to remove the unreacted olefinic material producing a slurry of solid polymer, washing the polymerizate with an aqueous medium to remove the catalyst decomposition products and recovering the solid polymerizate.

3. A polymerization process comprising the steps in combination of mixing together liquefied isobutylene and a multiolefin having from 4 to 9 inclusive carbon atoms per molecule, cooling the material by a liquefied hydrocarbon refrigerant to a temperature within the range from −10° C. to −160° C., adding thereto an insoluble soap of a fatty acid having from 6 to 18 carbon atoms per molecule and a metal selected from the group consisting of magnesium, zinc, aluminum and calcium, and polymerizing the mixture by the application thereto of a Friedel-Crafts halide catalyst to yield a fine-grained, non-coalescing slurry of solid polymer having a molecular weight within the range of 15,000 to 150,000.

4. A polymerization process comprising the steps in combination of mixing together liquefied isobutylene and a multiolefin having from 4 to 9 inclusive carbon atoms per molecule, cooling the material by a liquefied hydrocarbon refrigerant to a temperature within the range from −10° C. to −160° C., adding thereto zinc stearate, and polymerizing the mixture by the application thereto of a Friedel-Crafts halide catalyst to yield a fine-grained, non-coalescing slurry of solid polymer having a molecular weight within the range of 15,000 to 150,000.

5. A polymerization process comprising the steps in combination of mixing together liquefied isobutylene and a multiolefin having from 4 to 9 inclusive carbon atoms per molecule, cooling the material by a liquefied hydrocarbon refrigerant to a temperature within the range from −10° C. to −160° C., adding thereto aluminum stearate, and polymerizing the mixture by the application thereto of a Friedel-Crafts halide catalyst to yield a fine-grained, non-coalescing slurry of solid polymer having a molecular weight within the range of 15,000 to 150,000.

6. A polymerization process comprising the steps in combination of mixing together liquified isobutylene and a multiolefin having from 4 to 9 inclusive carbon atoms per molecule, cooling the material by a liquefied hydrocarbon refrigerant to a temperature within the range from −10° C.

to −160° C., adding thereto aluminum palmitate, and polymerizing the mixture by the application thereto of a Friedel-Crafts halide catalyst to yield a fine-grained, non-coalescing slurry of solid polymer having a molecular weight within the range of 15,000 to 150,000.

7. A polymerization process comprising the steps in combination of mixing together a major proportion of liquefied isobutylene with a minor proportion of liquefied isoprene, cooling the mixture to a temperature within the range between −10° C. and −160° C. by a hydrocarbon refrigerant, adding to the mixture zinc stearate and polymerizing the mixture by the application thereto of a Friedel-Crafts active halide catalyst to yield a fine-grained, non-coalescing slurry of solid polymer having a molecular weight within the range from 15,000 to 150,000.

8. In a polymerization process including the steps of cooling an olefinic material comprising a mixture of a major proportion of isobutylene and a minor proportion of a multiolefin having 4 to 9 inclusive carbon atoms per molecule to a temperature below −50° C. to as low as −150° C., adding an active halide Friedel-Crafts catalyst thereto and polymerizing the olefinic material to a desired stage to yield a solid polymer having a molecular weight within the range of 15,000 to 150,000; the steps in combination comprising adding a dispersing medium containing zinc stearate, warming the resultant mixture to remove the unreacted olefinic material, producing a slurry of solid polymer, washing the polymerizate with an aqueous medium to remove the catalyst decomposition products and recovering the solid polymerizate.

9. In a polymerization process including the steps of cooling an olefinic material comprising a major proportion of isobutylene and a minor proportion of butadiene to a temperature below −50° C. to as low as −150° C., adding an active halide Friedel-Crafts catalyst thereto and polymerizing the olefinic material to a desired stage to yield a solid polymer having a molecular weight within the range of 15,000 to 150,000; the steps in combination comprising adding a dispersing medium containing zinc stearate, warming the resultant mixture to remove the unreacted olefinic material, producing a slurry of solid polymer, washing the polymerizate with an aqueous medium to remove the catalyst decomposition products and recovering the solid polymerizate.

10. In a polymerization process including the steps of cooling an olefinic material comprising a major proportion of isobutylene and a minor proportion of isoprene to a temperature below −50° C. to as low as −150° C., adding an active halide Friedel-Crafts catalyst thereto and polymerizing the olefinic material to a desired stage to yield a solid polymer having a molecular weight within the range of 15,000 to 150,000; the steps in combination comprising adding a dispersing medium containing zinc stearate, warming the resultant mixture to remove the unreacted olefinic material, producing a slurry of solid polymer, washing the polymerizate with an aqueous medium to remove the catalyst decomposition products and recovering the solid polymerizate.

11. In a polymerization process including the steps of cooling an olefinic material comprising a major proportion of isobutylene and a minor proportion of dimethyl butadiene to a temperature below −50° C. to as low as −150° C., adding an active halide Friedel-Crafts catalyst thereto and polymerizing the olefinic material to a desired stage to yield a solid polymer having a molecular weight within the range of 15,000 to 150,000; the steps in combination comprising adding a dispersing medium containing zinc stearate, warming the resultant mixture to remove the unreacted olefinic material, producing a slurry of solid polymer, washing the polymerizate with an aqueous medium to remove the catalyst decomposition products and recovering the solid polymerizate.

PER K. FROLICH.

REFERENCES CITED

The following references are of record in the file of this patent:

UNITED STATES PATENTS

| Number | Name | Date |
| --- | --- | --- |
| 2,151,382 | Harmon | Mar. 21, 1939 |